(12) United States Patent
Fulton et al.

(10) Patent No.: US 6,667,019 B2
(45) Date of Patent: Dec. 23, 2003

(54) RARE EARTH OXIDE FLUORIDE NANOPARTICLES AND HYDROTHERMAL METHOD FOR FORMING NANOPARTICLES

(75) Inventors: John L. Fulton, Richland, WA (US); Markus M. Hoffmann, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 09/949,299

(22) Filed: Sep. 7, 2001

(65) Prior Publication Data

US 2002/0071802 A1 Jun. 13, 2002

Related U.S. Application Data

(62) Division of application No. 09/393,990, filed on Sep. 10, 1999, now Pat. No. 6,316,377.

(51) Int. Cl.⁷ .................................................. C01F 17/00
(52) U.S. Cl. ..................................... 423/263; 423/21.1
(58) Field of Search ............................. 423/263, 21.1; 502/302, 303, 304

(56) References Cited

U.S. PATENT DOCUMENTS

| | | | |
|---|---|---|---|
| 3,607,770 A | 9/1971 | Rabatin | 252/301.4 |
| 3,615,169 A | 10/1971 | Thom | 23/21 |
| 4,057,433 A | 11/1977 | Brown | 106/38.3 |
| 4,734,451 A | 3/1988 | Smith | 524/493 |
| 4,845,056 A | 7/1989 | Yamanis | 501/12 |
| 5,417,956 A | * 5/1995 | Moser | 423/263 |
| 5,635,154 A | * 6/1997 | Arai et al. | 423/263 |
| 5,652,192 A | 7/1997 | Matson et al. | 502/304 |
| 6,066,305 A | 5/2000 | Dugger | 423/263 |

FOREIGN PATENT DOCUMENTS

| | | |
|---|---|---|
| EP | 0 241 083 | 10/1987 |
| JP | 02 165 963 | 6/1990 |
| WO | WO 93/17959 | 9/1993 |
| WO | WO 98/54607 | 12/1998 |

OTHER PUBLICATIONS

Grant & Hackh's Chemical Dictionary, 5th edition, 1987, no month, p. 496.*

Anderson, GM, et al., "Reactions of Quartz and Corundum With Aqueous Chloride and Hydroxide Solutions at High Temperatures and Pressures." Pg. 12–27. Jan. 1967, Am. J. Sci, vol. 265.

Darab JG. et al., "Continuous Hydrothermal Processing of Nano–Crystalline Particulates for Chemical–Mechanical Planarization." Pg. 1069–1071. 1998, no month, J. Electronic Mat., vol. 27, No. 10.

Dawson, WJ., "Hydrothermal Synthesis of Advanced Ceramic Powders." Pg. 1673–1678, no month, Ceramic Bulletin, vol. 67, No. 10.

Fedoseev, AD. et al., "Die Hydrothermalsynthese Faseriger Amphibole und die Untersuchung Einiger Ihrer Eigenschaften." Pg. 65–102. 1968. (German Translation.), no month.

Hoffman, MM., et al., "Unusual Dysprosium Ceramic Nano–Fiber Growth in a Supercrytical Aqueous Solution." Pg. 4177–4183. 2000, no month, J. Mat. Sci. 35.

Kozak, AD. et al., "Le SystèDyF₃—Dy₂O₃." Pg. 440–443. (French Translation.), no month.

Manning, CE., "The Solubility of Quartz in H2O in the Lower Crust and Upper Mantle." Pg. 4831–4839. 1994, no month. Geochimica et Cosmochimica Acta., vol. 58, No. 22.

Matson, DW. et al., "Production of Nanocrystalline Sulfated Zirconia Catalysts via a Flow–Through Hydrothermal Process." Pg. 287–292, 161–166. 1998, no month. Mat. Res. Soc. Symp. Proc. vol. 520.

Matson, DW. et al., "Rapid Expansion of Supercrytical Fluid Solutions: Solute Formation of Powders, Thin Films, and FIbers." Pg. 2298–2305. 1987, no month, Ind. Eng. Chem. Res., 26.

Niihara, K et al., "The Crystal Structure and Nonstoichoimetry of Rare Earth Oxyfluoride." Pg. 643–648. Mar. 1971, Bulletin Chem. Soc. Japan, vol. 44.

Niihara, K. et al., "Studies of Rare Earth Oxyfluorides in the High–Temperature Region." Pg. 20–23. Jan. 1972, Bulletin Chem. Soc. Japan vol. 45, No. 1.

Oota, T. et al., "Synthesis of Potassium Hexatitanate Fibers by the Hydrothermal Dehydration Method." Pg. 331–338. 1979, J. Crystal Growth, 46.

Thoma, RE. et al., "Equilibrium Dimorphism of the Lanthanide Trifluorides." Pg. 1937–1939, Nov. 1966.

Wendlandt, HG. et al, "The Reaction of Oxides with Water at High Pressures and Temperatures." Pg. 47–53, 1964, no month.

Wenjun, LI et al., "Synthesis of ZnO Fibers and Nanometer Powders by Hydrothermal Method." Pg. 449–459. Oct. 1998., Sci in China, Series E, vol. 41, No. 5.

Xiufeng, W. et al., "Hydrothermal Processing of Nano Ceramic Powder." Pg. 1–6. 1995. (Japanese Translation with English Abstract), Aug., Rare Metal Mat. Eng., vol. 24, No. 4.

* cited by examiner

Primary Examiner—Steven Bos
(74) Attorney, Agent, or Firm—Klarquist Sparkman, LLP

(57) ABSTRACT

A hydrothermal method for forming nanoparticles of a rare earth element, oxygen and fluorine has been discovered. Nanoparticles comprising a rare earth element, oxygen and fluorine are also described. These nanoparticles can exhibit excellent refractory properties as well as remarkable stability in hydrothermal conditions. The nanoparticles can exhibit excellent properties for numerous applications including fiber reinforcement of ceramic composites, catalyst supports, and corrosion resistant coatings for high-temperature aqueous solutions.

15 Claims, 2 Drawing Sheets

RARE EARTH OXIDE FLUORIDE NANOPARTICLES AND HYDROTHERMAL METHOD FOR FORMING NANOPARTICLES

This is a divisional of U.S. patent application Ser. No. 09/393,990, now U.S. Pat. No. 6,316,377, filed Sep. 10, 1999.

This invention was made with Government support under Contract DE-AC0676RLO 1830 awarded by the U.S. Department of Energy. The Government has certain rights in the invention.

FIELD OF THE INVENTION

The present invention relates to nanoparticles containing oxygen, fluorine and a rare earth element or yttrium or scandium. The invention also relates to a hydrothermal method for forming nanoparticles.

BACKGROUND OF THE INVENTION

Hydrothermal reactions, i.e., reactions that take place in hot water at high pressures, have industrial and scientific importance in forming materials such as zeolites and large single crystals. A difficulty with hydrothermal reactions is the high rate of corrosion caused by the conditions necessary to conduct hydrothermal reactions. For example, corrosion of the material lining the walls of a hydrothermal reactor can cause contamination of the product and may even cause a catastrophic failure and explosion of the reactor vessel. Another difficulty is that catalyst support materials that are used in hydrothermal reactions can dissolve or change morphology in a sustained hydrothermal environment. Although ceramic materials have many desirable features for use in reactors, such as linings for reactor chambers and catalyst supports for aqueous phase reactions, ceramic materials are especially sensitive to the corrosive effects of hydrothermal conditions. See, for example, Wendlandt, et al., "The Reactions of Oxides with Water at High Pressures and Temperatures," Angew. Chem. Int'l. Ed., vol. 3, p47 (1964).

Great efforts have been devoted to the development of new refractory materials. For example, Brown in U.S. Pat. No. 4,057,433 describes a mold having a facing portion comprising finely divided particles of the oxyfluorides of the lanthanide and actinide series. Brown states that the finely divided particles have a particle size of from below 400 mesh to 5 mesh, i.e. having a particle size of from 0.1 to 4000 microns. In the examples section of U.S. Pat. No. 4,057,433 a particle size of 325 mesh (44 micron) is used. Preparations of rare earth oxyfluorides are known (see, e.g., Niihara et al, Bull. Chem. Soc. Jap., 44, 643 (1971) and deKozak, et al., Rev. de Chimie Miner., 17, 440 (1980)); however, particles are obtained by pulverizing, and it is known that particle sizes of 1 micron and less are generally not obtainable by conventional grinding processes. Brown does not discuss grinding processes and does not discuss the morphology of the oxyfluorides nor their stability in hydrothermal conditions. In general, morphology and hydrothermal stability cannot be predicted based on a chemical formula since factors such as crystal growing conditions and crystal structure can have a strong influence on a material's properties. Moreover, there is no known correlation between a ceramic material's refractory properties and its performance in hydrothermal conditions.

Dugger in WO 93/17959 discloses that various oxyhalide complexes are useful precursors for making refractory oxides. Dugger does not disclose particle sizes of the oxyhalide precursors (other than passing through a screen size such as 200 mesh) and does not discuss the morphology of the oxyfluorides nor their stability in hydrothermal conditions.

In making ceramic articles it is frequently desirable to use small particles because, relative to larger particles, smaller particles are more reactive and sinter at lower temperatures. However, under hydrothermal conditions, small particles tend to dissolve and (in saturated solutions) deposit on a large crystal, such as a seed crystal, to form large crystalline materials. In other words, in a static cell, or equilibrium, hydrothermal conditions favor the dissolution of small particles and the formation of large particles.

Indeed, nanometer-sized particles have so far only been obtained from a supercritical aqueous environment by two types of non-equilibrium processes. The first approach has been to limit crystal growth by inducing an abrupt homogeneous nucleation of a dissolved solute in the region of an expanding jet (see, e.g., Smith, U.S. Pat. No. 4,734,451, Matson et al., J. Mat. Sci. 22, 1919 (1987)) or the rapid thermal decomposition of precursors in solution. The second widely used non-equilibrium approach for production of nanoparticles employs a solid component as one of the reacting starting materials whereby the rate of dissolution limits the precipitation. Examples of the second approach are described in references such as Oota, et al., J. Cryst. Growth 46, 331 (1979) and Fedoseev, et al., Kristall und Technik 3, 95 (1968). Finally, at subcritical temperatures (200° C.), whiskers of hydroxyapatite with widths of 0.1 to 1 micrometer ($\mu$m) were obtained from a dilute solution of beta-$Ca_3(PO_4)_2$ near the vapor pressure of the solution. See Yoshimura, et al., J. Mater. Sci., 29 3399 (1994).

There remains a need for hydrothermal processes for forming nanoparticles under equilibrium conditions and/or from a single phase solution. There is a further need for rare earth oxygen-containing fluoride nanoparticles. There is also a need for nanoparticle materials that are hydrothermally stable and/or have a fiber morphology.

SUMMARY OF THE INVENTION

The present invention provides a method of making a nanoparticle material. In this method, an aqueous precursor composition is prepared that contains (a) a rare earth element or yttrium or scandium and (b) fluorine. The aqueous precursor composition is heated to a temperature of at least about 200° C. under increased pressure for a time sufficient to obtain the nanoparticle material.

In a second aspect, the invention provides a rare earth element oxygen-containing fluoride material. This material comprises nanoparticles that have a diameter smaller than one micrometer and are composed of, at least: (a) a rare earth element or yttrium or scandium, (b) oxygen, and (c) fluoride.

One object of the invention is to provide a method for making nanoparticles under hydrothermal conditions. It is another object of the invention to provide nanofibers of a rare earth, yttrium or scandium oxygen-containing fluoride. Another object of the invention is to provide a nanoparticle material that is stable to high temperature and high pressure conditions.

The subject matter of the present invention is particularly pointed out and distinctly claimed in the concluding portion of this specification. However, both the organization and method of operation, together with further advantages and objects thereof, may best be understood by reference to the following drawings and description.

DESCRIPTION OF THE PREFERRED EMBODIMENTS

Figure 1:
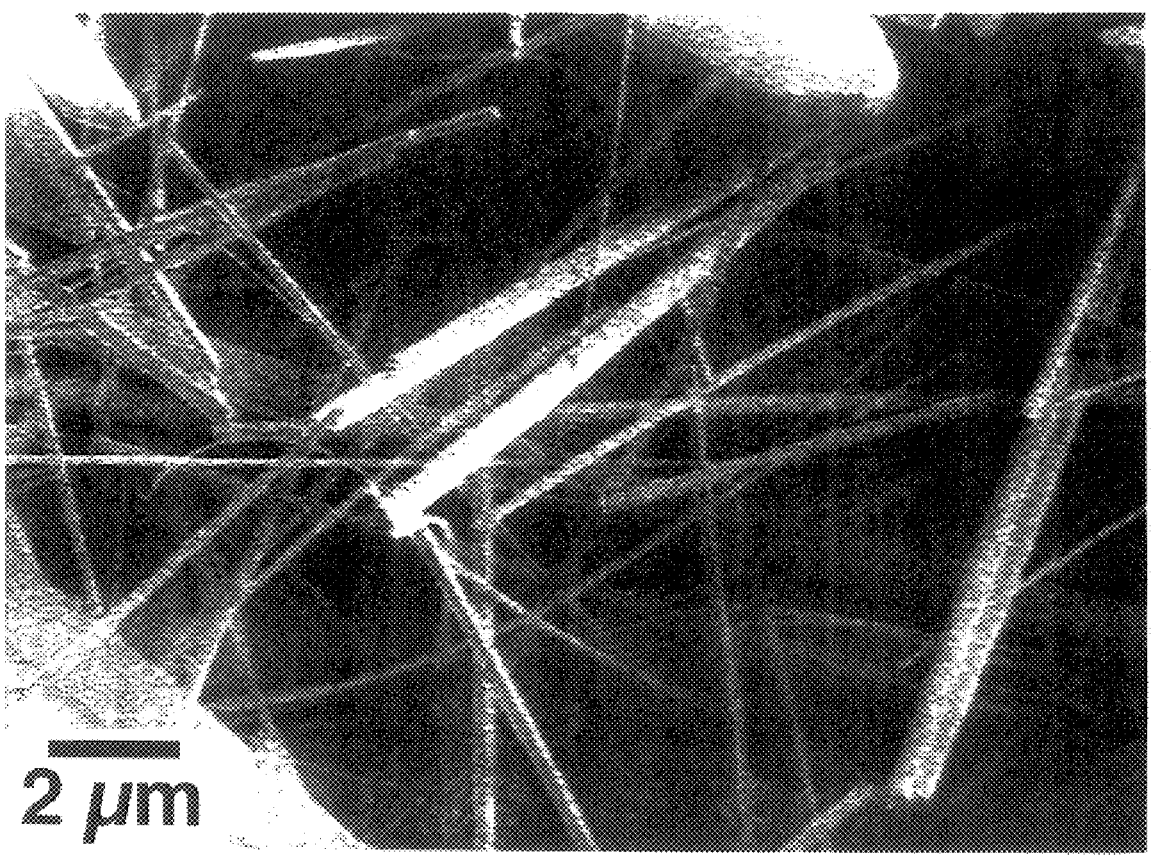
FIG. 1 is a photomicrograph of nano-fibers of a dysprosium oxygen-containing fluoride.

According to a method of the invention, an aqueous precursor composition is formed prior to forming nanoparticles. In addition to water, the precursor composition contains at least two elements: (1) a rare earth element (the lanthanides and actinides), yttrium, or scandium, and (2) fluorine. The water is in the fluid state which includes liquid, gas and fluid above the critical temperature. Although additional solvents can be present, the solvent is primarily water and, in many embodiments the solvent is greater than 90% water, or, pure water.

In a preferred embodiment, the nanoparticles are formed from a single phase hydrothermal solution, i.e., there is no solid present at the start of the reaction. The starting materials may not be completely soluble at room temperature but are preferably soluble under hydrothermal conditions. More preferably, the starting materials are water soluble at room temperature and pressure—this allows for a simpler synthetic method and better process control. Thus, in a preferred method, the starting materials are dissolved in water at room temperature to form an aqueous precursor solution. For greater purity, the solution can be filtered prior to its introduction into a hydrothermal process chamber. Examples of preferred starting materials include one or more rare earth (or yttrium or scandium) halides such as a lanthanide trifluoride, more preferably bromides (such as a lanthanide tribromide), and water-soluble fluoride salts (preferred examples include hydrogen fluoride and/or an alkali fluoride such as sodium fluoride). It is believed that fluorine gas may also be used. It has been found that the presence of fluoride produces nanoparticles that could not be obtained if bromine were substituted for fluorine. The oxygen in the product oxide typically originates from water, but can originate from added oxygen-containing materials such as oxygen, hydrogen peroxide, nitrogen oxides, nitrate, perchlorate, or organic oxidizers such as alcohols, carboxylic acids, organic peroxides, dimethyl ester, etc. Preferably, the oxygen source (usually water) and the rare earth (or Y or Sc) compound are in excess with fluorine being the limiting reagent. Preferred concentrations of starting materials range from the saturation concentration at hydrothermal conditions to about 1 mol %, preferably less than 25 mol %, more preferably less than about 10 mol %.

Mineralizing salts can also be added to the hydrothermal solution to help control particle morphology. These salts can include materials such as sodium perchlorate and alkali halides such as sodium chloride and potassium bromide. If present, the concentrations of mineralizing salts is preferably less than 30 mol %, more preferably less than 5 mol %, and still more preferably less than 1 mol %. Other additives may include substances to adjust the pH of the solution. These could include inorganic acids or bases such as sodium hydroxide, ammonia, nitric acid, hydrochloric acid, or organic acids or bases such as acetic acid and ethanolamine.

To form the product nanoparticle material, the aqueous precursor composition is heated under increased pressure. The aqueous precursor composition must be heated to a temperature of at least about 200° C. For better results in terms of factors such as particle size, morphology, and speed of reaction, the aqueous precursor composition is heated to at least 300° C., and more preferably between 400 and 500° C. Increased pressure means a pressure of at least the vapor pressure at the hydrothermal reaction temperature. More preferably, the pressure is between 50 and 600 bar, and more preferably between 400 and 500 bar. It is believed that better results are obtained when the pressure is sufficiently high such that solution densities are higher than about 0.25 g/cc in order to keep the precursor components in solution.

Heat and pressure are applied for a time sufficient to form nanoparticles. In the inventive method, rapid decrease in temperature or pressure is not required to form the nanoparticles, rather, the nanoparticles can be formed in static cell type conditions. Although it is not a required aspect of the inventive method, it is believed that the starting materials react and form rare earth oxygen-containing fluoride species that precipitate as nanoparticles during the application of heat and pressure, and the hydrothermal stability of the nanoparticles prevents redissolution and formation of larger particles. Optimal reaction times will vary depending on factors such as concentration of starting materials, temperature and pressure; however, the reaction times can be optimized through routine experimentation. Preferred reaction times are typically between 10 minutes and 48 hours.

The inventive method is preferably conducted in equilibrium-like conditions; that is, the inventive nanoparticle material can form under equilibrium-like conditions. "Equilibrium-like conditions" refers to conditions in which the temperature and pressure are stable over time; stable meaning changing by less than 10%. Additionally, under equilibrium-like conditions, the particle morphology preferably does not change by more than 10% for times longer than 6 hours, more preferably longer than 12 hours, and still more preferably, longer than 6 days under hydrothermal conditions. For industrial applications, the inventive process can be conducted in continuous or batch reactors. One suitable continuous reactor is schematically illustrated by Dawson in "Hydrothermal Synthesis of Advanced Ceramic Powders," Ceram. Bull. 67, 1673–78 (1988). Batch reactors can include any of the commercially available hydrothermal, static-cell reactors, or similar versions enlarged for industrial production.

The nanoparticle material of the present invention includes (1) a rare earth element (the lanthanides and actinides), yttrium, or scandium, (2) oxygen, and (3) fluorine. Additionally, it is contemplated that other elements could be substituted for these as may be identified as equivalents by subsequent studies. Due to its unique electronegativity, in solids, fluorine is always in the form of a fluoride. The same is generally true of oxygen. Oxides of the invention include any oxygen-containing moities with $O^{2-}$ and $OH^-$ being the preferred forms. Additional elements may also be present. In a preferred embodiment, the amount of rare earth element, yttrium, and/or scandium in the nanoparticle material is between about 10 and 50 mol %, oxygen is between about 20 and 70 mol % and fluorine is between about 20 and 70 mol %. In preferred embodiments, the nanoparticle material contains material having the structure (as determined by x-ray diffraction (XRD)) corresponding to the $Y(OH)_2F$ XRD pattern shown in FIG. 2. In another preferred embodiment, the nanoparticle material contains material having the structure corresponding to the $Dy_{1+x}O_{3x}F_{3-3x}$ XRD pattern shown in FIG. 2 where x is greater than 0.1 and less than 0.9. In another preferred embodiment, the nanoparticle material contains material having the structure $DyOH_{3x}F_{3-3x}$, where x is greater than 0.1 and less than 0.9. In any of the above structures, any of the rare earth elements, Y or Sc could substitute for the Y or Dy.

For purposes of the present invention, nanoparticles are defined to be particles having at least 1 dimension that is less than 1 μm, and nanofibers are defined to have an approximately circular cross-section and a diameter less than 1 μm. More preferably, the nanoparticles have a dimension that is between about 10 and 100 nanometers (nm). Higher proportions of nanoparticles are preferred. Thus the nanoparticle material is preferably at least 50% nanoparticles by mass (as determined by SEM or TEM), more preferably, at least 90% nanoparticles by mass. Longer fibers are generally preferred for strengthening composite materials, nanofibers of the present invention are preferred to have a length to diameter aspect ratio of at least 10, more preferably at least 100. Preferably, the material is at least 50% nanofibers by mass, more preferably, at least 90%.

Nanoparticles of the present invention can exhibit excellent stability in hydrothermal conditions. In a preferred embodiment, the nanoparticles maintain their dimensions (as measured by SEM or TEM) and maintain at least 90% of their mass, i.e. they do not dissolve, even after 12 hours, and more preferably 6 days, in water at 300° C., and more preferably 400° C., and pressures of about 400 bar.

The present invention provides numerous advantages and discoveries of results that are unexpected in view of prior work in this area. It is remarkable that nanoparticles, especially nanofibers, can be grown under hydrothermal conditions where one would instead expect to grow large crystals (like hydrothermal production of quartz). The stability of the inventive nanoparticles in hydrothermal conditions is also quite surprising. The development of a fiber morphology in these materials is also quite unexpected. It was also surprising that analogous compounds were not formed when bromine was substituted for fluorine.

The nanoparticle material of the present invention can be used to make composites, catalyst supports (especially for aqueous phase catalysts), and corrosion resistant coatings. Due to their small structural dimensions, nanofibers of the present invention can make an excellent high-strength material for fiber reinforcement of ceramic composites, especially for applications at high temperatures and high stresses. The nanoparticles of the present invention, either sintered or in powder form, may also be used as a high surface area support for catalysts. In addition, the invention provides materials that are highly corrosion resistant to high-temperature (supercritical) water solutions. Hence, these new materials are ideally suited for applications as corrosion resistant coatings in high-temperature aqueous solutions.

EXAMPLES

Samples were synthesized in a high pressure batch reactor made from Hastelloy C-22 having an internal volume of approximately 5 ml. Precursor solutions were introduced through feed lines made from a titanium alloy. The cell was heated with cartridge heaters to a temperature of ±3° C. using a three-mode controller (Omega No. CN3000). Pressure was applied using a standard syringe pump (ISCO Model 100DX), and the systems pressure was monitored to within ±1 bar with a calibrated electronic transducer (Precise Sensors, No. D451). The chemicals were obtained from Aldrich Chemical Co. and used as received. Doubly distilled water was used for all experiments.

Scanning electron microscopy (SEM) analysis was carried out using a LEO 982 Field Emission Scanning Microscope equipped with a SiLI detector of 128 eV resolution and an Oxford ISIS energy dispersive x-ray microanalysis system. The transmission electron microscope (TEM) was equipped with a field-emission gun (FEG) and an energy dispersive x-ray spectrometer (EDS) system which allows compositional analysis with a 0.7 nm FWHM probe size (beam current=0.25 nA).

Example 1

A 0.2 molal $DyBr_3$/0.02 molal NAF solution was heated to 450° C. at 450 bar pressure in the high-pressure cell. After 3 hours, 10 mL of a 0.01 molal NaF solution was flushed through the cell. Temperature and pressure were maintained for another 17 hours before the cell was cooled to room temperature. The cell was opened to reveal a white fibrous product.

Figure 2:
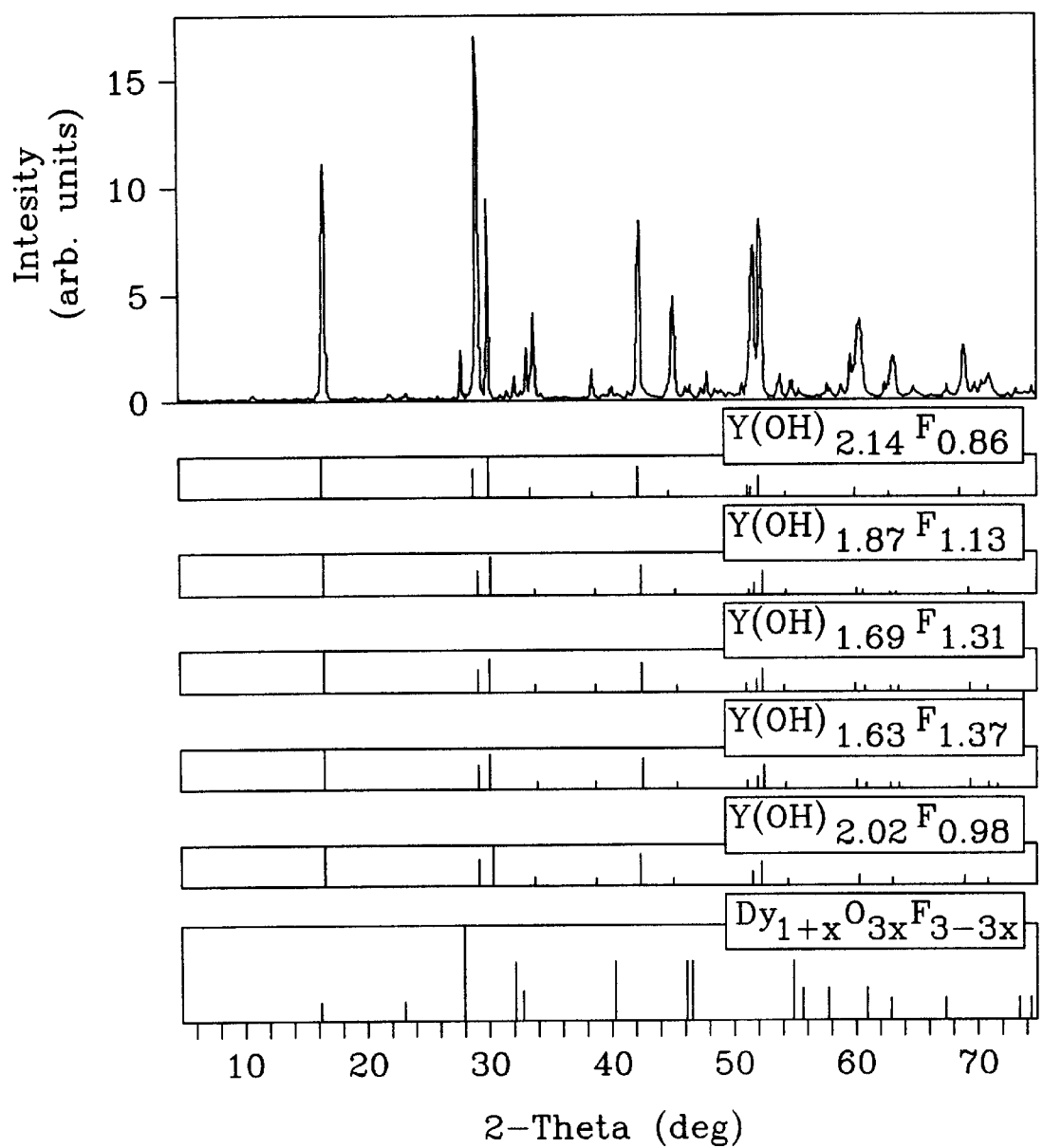
FIG. 2 is an x-ray diffraction scan comparing a dysprosium oxygen-containing fluoride (top) made according to the methods of the invention with various known patterns.

An SEM analysis of the product (see FIG. 1) revealed fibers several μm in length having diameters of from about 20 to 100s of nm, with no fibers larger than 1 μm in diameter. A few particles having a long platelet morphology were also observed. Energy dispersive x-ray microanalysis of the fibers revealed the presence of dysprosium, fluorine and oxygen in the fibers. An XRD scan of the product is shown in FIG. 2 (top) and is compared with XRD patterns of known materials. The closest match of the sample's major phase was yttrium hydroxide fluoride, a hexagonal crystal structure of the space group $P6_3/m$. This finding suggests that the major phase is isomorphic with yttrium hydroxide fluoride with dysprosium substituting yttrium. The principal minor phase present was matched to $Dy_{1+x}O_{3x}F_{3(1-x)}$ (DeKozak et al., Rev. Chim. Miner. 17 (1980) 440.

Example 2

$Dy_{1+x}O_{3x}F_{3(1-x)}$ was unexpectedly produced while conducting experiments with a 0.2 molal dysprosium bromide solution (at conditions of 435° C., 500 to 690 bar pressure, for about 3 hours) that contained an unknown fluoride impurity. The product survived at least 100 hours in aqueous solutions (including $NiBr_2$) at temperatures exceeding 400° C. without redissolving or aggregating into larger sized morphologies. Compared to Example 1, the SEM analysis of the second sample show generally smaller diameter fibers, and, again, a number of plate-like particles. Energy dispersive x-ray microanalysis showed that both the platlets and the fibers contain dysprosium, fluorine and oxygen. The XRD of this sample showed that the major phase was $Dy_{1+x}O_{3x}F_{3(1-x)}$ and the sample did not contain the hexagonal, yttrium hydroxide isomorphic phase that is the major phase of sample 1. A possible explanation for the absence of the hydroxide phase is that the sample dehydrated over the long exposure to high-temperature water.

Example 3

Comparative Example

A 0.2 molal dyprosium bromide solution was treated under static cell conditions at 450° C. and 515 bar for 17 hours. Nanoparticles were not formed.

Closure

While some preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of making a nanoparticle material comprising the steps of:
   (a) preparing an aqueous precursor composition comprising at least a first ingredient selected from a rare earth element, scandium or yttrium, and a second ingredient comprising a fluorine material; and
   (b) heating the precursor composition to a temperature of at least about 200° C. and increased pressure for a time sufficient to obtain the nanoparticle material.

2. The method of claim 1 wherein the aqueous precursor composition is prepared from a composition comprising a halide of a rare earth element or yttrium.

3. The method of claim 1 wherein the second ingredient comprises sodium fluoride.

4. The method of claim 1 wherein the aqueous precursor composition is greater than 90 mol % water.

5. The method of claim 1 wherein nanoparticle material is obtained under equilibrium-like conditions.

6. The method of claim 1 wherein the aqueous precursor composition is heated to a temperature of at least 300° C.

7. The method of claim 6 wherein the pressure is between 400 and 500 bar.

8. The method of claim 1 wherein the fluorine material comprises hydrogen fluoride, an alkali fluoride, or fluorine gas.

9. The method of claim 1 wherein the increased pressure is at least equal to the vapor pressure of the heated precursor composition.

10. The method of claim 1 wherein the nanoparticle material precipitates from the precursor composition.

11. The method of claim 1 wherein the fluorine material comprises an alkali fluoride and the first ingredient comprises a rare earth element.

12. A method for making a nanoparticle material comprising:
   mixing at least a first ingredient selected from a rare earth element, scandium or yttrium, with a second ingredient comprising a fluorine material resulting in an aqueous precursor composition; and
   subjecting the aqueous precursor composition to a temperature of at least about 200° C. and a pressure sufficient to obtain the nanoparticle material.

13. The method of claim 12 wherein the fluorine material comprises hydrogen fluoride, an alkali fluoride, or fluorine gas and the first ingredient comprises a halide of a rare earth element, scandium or yttrium.

14. The method of claim 12 wherein the fluorine material comprises an alkali fluoride and the first ingredient comprises a rare earth element.

15. The method of claim 12 wherein the nanoparticle material precipitates from the precursor composition.

* * * * *